Dec. 8, 1964 F. N. TADDONIO 3,160,373
EXTERNAL STORE FOR AIRCRAFT
Filed Sept. 25, 1963 2 Sheets-Sheet 2
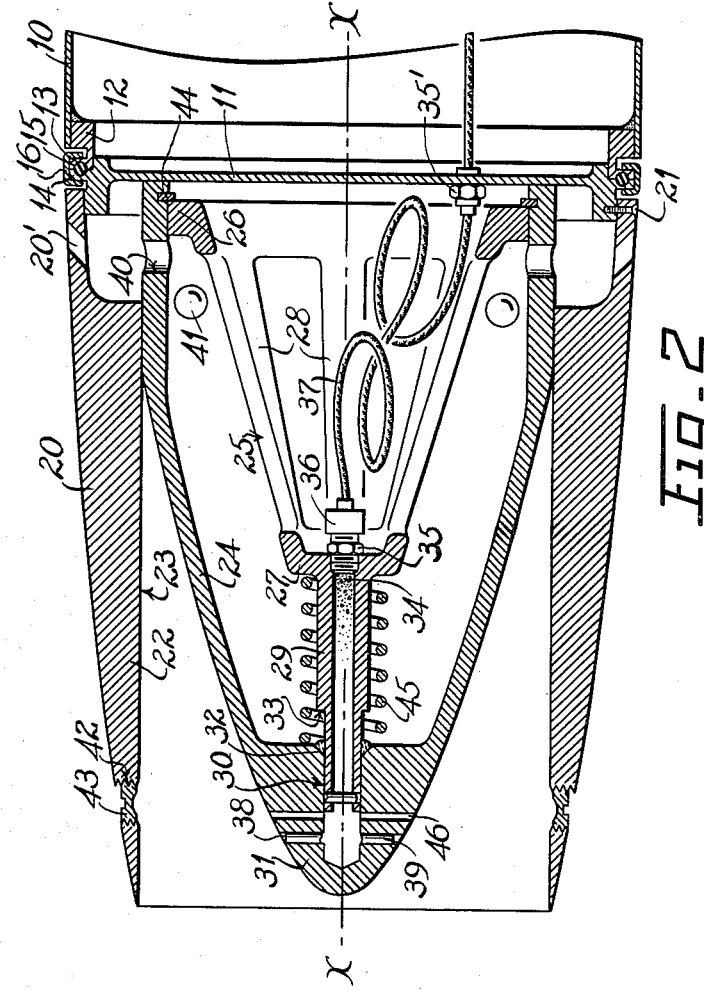
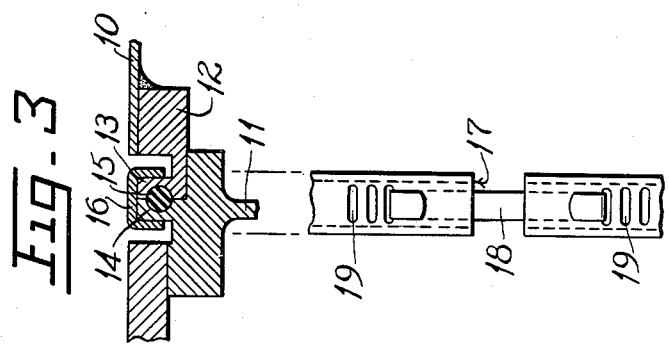
INVENTOR.
FLORIAN N. TADDONIO
BY
ATTORNEY United States Patent Office 3,160,373
Patented Dec. 8, 1964

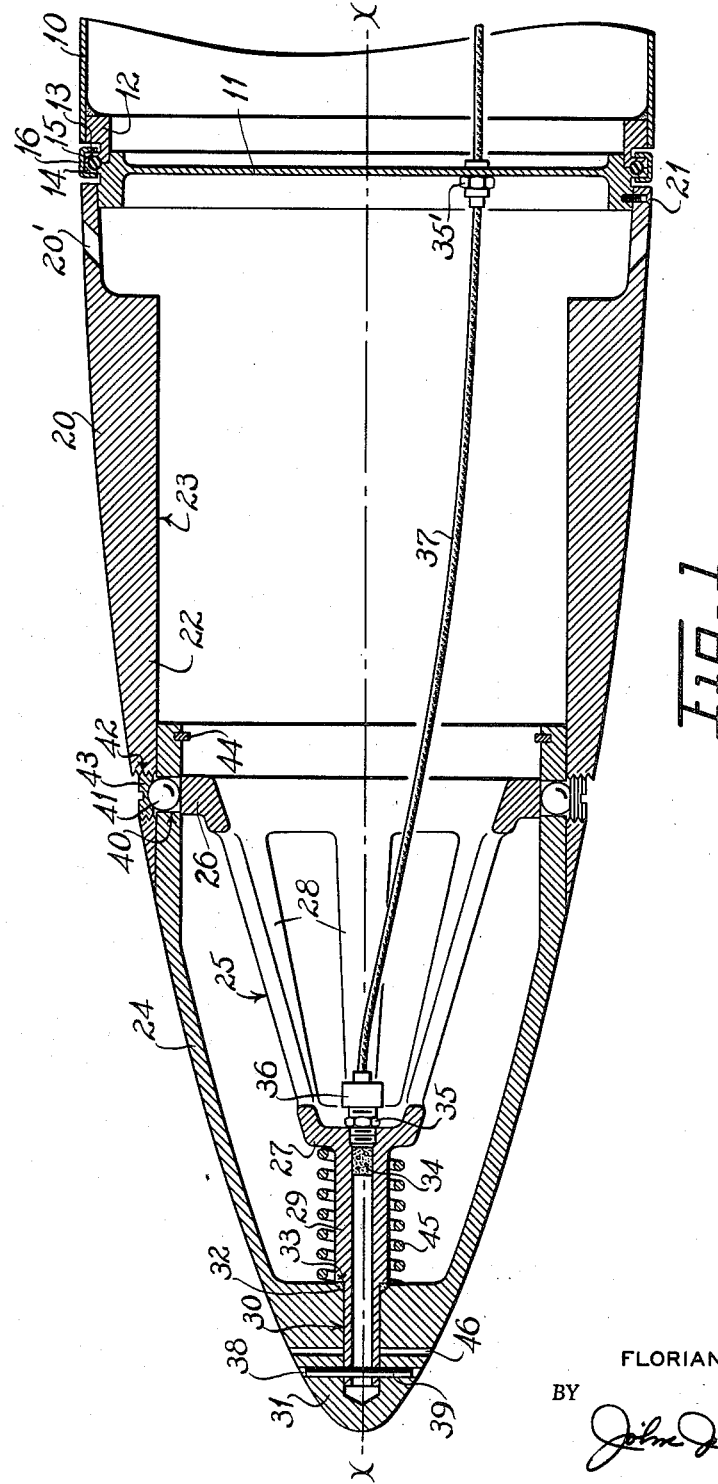

3,160,373
EXTERNAL STORE FOR AIRCRAFT
Florian N. Taddonio, Plainview, N.Y., assignor to Republic Aviation Corporation, near Farmingdale, N.Y., a corporation of Delaware
Filed Sept. 25, 1963, Ser. No. 311,463
7 Claims. (Cl. 244—137)

This invention relates broadly to external stores, such as bombs, fuel tanks, torpedoes, etc., carried by aircraft and adapted to be dropped or jettisoned therefrom during flight and particularly to such a store having a variable aerodynamic configuration for optimum performance both during flight on an aircraft and subsequent to separation therefrom especially at speeds approaching and in the sonic and supersonic regimes.

External stores of aircraft are preferably streamlined in design lest they adversely affect aerodynamic performance of the vehicle, i.e., produce drag, instability, etc. This very design, however, renders their separation or ejection from the aircraft difficult, if not impossible, due to their tendency toward sustained flight after release. At the higher speeds referred to above the released store continues indefinitely in free flight alongside the aircraft.

In order to overcome this problem various controls, ejectors and the like have been proposed to positively effect separation of the store from the aircraft as well as a predictable trajectory thereof following ejection. Use of these devices, however, is limited due among other things to the forces required particularly for ejection at sonic and supersonic speeds. Additional limitations to the use of such devices in controlling the store's trajectory are due to stability problems, where important, as in the case of bombs, torpedoes, etc., subsequent to ejection regardless of speed.

For ejection it has been found that blunt, high drag configurations give the best results both with respect to separation and subsequent stability. For example, in pilot escape system studies the so-called "bluff" shaped capsule enclosing a pilot's ejection seat, the skip flow generator for attachment to an open pilot's ejection seat, and other schemes have been developed for both positive and clean separation of the pilot and his survival equipment and stability thereafter during descent.

Among other things the present invention contemplates means incorporated within the store to convert it from its streamline configuration during flight to a blunt, high drag configuration for ejection. To these ends the instant invention proposes that a collapsible nose section be connected to the forward or upstream end of the store body per se. This nose section is formed by multiple telescopically associated segments constituting a conical forebody on the store assembly. Thus, in its extended position the nose section establishes a streamline configuration for the store corresponding to the optimum flight condition and when contracted produces a substantially blunt, high drag configuration corresponding to the optimum ejection and stability condition.

With the above and other objects in view as will be apparent this invention consists in the construction, combination and arrangement of parts all as hereinafter more fully described, claimed and illustrated in the accompanying drawings, wherein:

FIG. 1 is a longitudinal section of the forward or upstream end of a store including a collapsible forebody or nose section connected thereto and projecting therefrom in its extended position to show the low drag flight configuration it establishes for the store when carried externally on an aircraft;

FIG. 2 is a similar view with the forebody in the collapsed or contracted position to show the high drag flight configuration it establishes for the store immediately prior to and following its separation from the aircraft; and FIG. 3 is a fragment of the assembly illustrated in FIGS. 1 and 2 to show a preferred connection means employed to secure the collapsible forebody to the main body of the store.

Referring more particularly to the drawings, 10 designates a fragment of the main body portion of a store having a longitudinal centerline X—X and adapted to be releasably mounted on and carried externally by an aircraft. At its forward or upstream end the main body 10 is closed by a bulkhead 11 that is preferably removable. To this end the main body 10 terminates in an extension 12 secured, as for example by welding, to the inner surface thereof so as to project therefrom. At its outer end the extension 12 terminates in a flange 13 adapted to abut a corresponding flange 14 projecting medially from the peripheral surface of the bulkhead 11 with sealing means 15 interposed between the adjacent faces of the flanges. When thus disposed a locking ring clamp 16 having a U shape in section overlies the flanges and retains them in immovable relation.

The clamp 16 is interrupted in its length, i.e., split as at 17 and provided with appropriate connecting means such as for example a rigid band or strap 18 engageable at its ends in slots 19 provided in adjacent ends of the clamp 16 whereby it is tightened and locked to apply a clamping force on the flanges 13 and 14. The external peripheral surface of the clamp 16 when thus secured is disposed substantially in the plane of the outer surface of the main body 10 of the store.

A collapsible, conical forebody is adapted to be connected concentrically to the main body 10 to project with its apex upstream and thereby establish an aerodynamically clean, streamlined configuration for the store. This corresponds to the optimum flight condition where minimum drag results from the externally carried store by the aircraft. Generally, this collapsible forebody comprises a plurality of segments telescopically associated and interconnected one to another in the extended position by releasable lock means operable to permit the contraction of the segments. When thus contracted the several segments of the forebody are nested one within the other with the apex retracted thereby enlarging the effective frontal area thereof. This establishes a blunt configuration for the store corresponding to the optimum ejection and stability condition.

More specifically, a tubular, truncated supporting structure 20 having an external surface which forms a smooth continuation of the external surface of the main body 10 overlies at one of its ends the peripheral surface of the bulkhead 11 to which it is secured preferably by removable fastening means 21. The forward end of the support 20 is provided with an enlarged or thickened wall 22 establishing an inner surface 23 substantially parallel to the centerline X—X which serves as a bearing surface for the aft end of a nose cone 24 telescopically associated therewith. Forwardly the apex of the nose cone 24 terminates at the centerline X—X.

Within the nose cone 24 a piston 25 is mounted for limited reciprocation. This piston comprises a circular aft ring 26 having an external diameter substantially equal to the internal diameter of the nose cone 24 at its aft end and a relatively small disc 27 in spaced relation thereto and forward thereof, both ring and disc being concentrically disposed about the centerline X—X. The disc 27 and ring 26 are interconnected to form a unitary assembly by a plurality of legs 28.

The forward face of the disc 27 is provided with a cylindrical extension 29 adapted to seat and reciprocate within a recess 30 in the forward end of the nose cone.

For this purpose the apex portion of the nose cone 24 is thickened internally as at 31 and the outer edge thereof defining the recess 30 is bevelled to receive and retain a seal 32. A shoulder 33 is formed on the extension 29 to limit its projection into the recess 30.

Centrally, the extension 29 and disc 27 are each bored and an explosive cartridge 34 is mounted therein being secured in place by means 35 in the form of a fitting. This fitting 35 is threadably mounted in the bore of the disc 27 in opposition to the extension 29 and serves to close said bore and includes connection means 36 for a lead 37 by which the cartridge 34 is fired from a remote control within the aircraft. An appropriate sealed fitting 35' may be employed in the bulkhead 11 for the passage of the lead 37 therethrough.

The thickened forward portion 31 of the nose cone 24 and the extension 29 are each pierced transversely by corresponding holes 38 adapted to align and receive and retain a shear pin 39 by which they are normally secured against relative movement as a unitary structure. When so positioned the outer peripheral surface of the piston ring 26 underlies a plurality of transverse openings 40 in the nose cone 24 adjacent its aft end. The diameter of each such opening 40 is greater than the thickness of the wall of the nose cone 24 in that area to the end that a ball 41 disposed within the opening extends beyond the outer wall of the nose cone and seats within a corresponding opening 42 that pierces the wall 22 of the support 20 when aligned therewith.

The outer end of each opening 42 is closed by suitable plugs 43 so that retention of the several balls 41 within their respective aligned openings 40 and 42 between ring 26 and their associated plugs 43 constitutes a lock to secure the segments of the collapsible forebody, i.e., support 20 and nose cone 24 in the extended position. The length of each plug 43 is such that its insertion in its respective opening 42 permits less than one half of the associated ball 41 to seat in that opening 42 for reasons to become more apparent.

By virtue of the foregoing construction, firing of the cartridge releases gases which expand within the bored extension 29 and exert a force of sufficient magnitude to shear the pin 39 causing a rearward movement of the piston 25 and releasing the several balls 41. The nose cone 24 is thereafter unlocked from the support 20 during flight by the air stream striking it and moving the entire nose cone 24 in an aft direction within the support. Vents in the form of louvers 20' are provided in the wall of the support 20 adjacent the aft end thereof to allow the escape of air from within the forebody upon retraction of the nose cone 24. When fully retracted the forward end of the nose cone 24 is disposed substantially in the plane of the forward lip or edge of the support 20 and constitutes in effect a blunt frontal area producing a high drag configuration.

In the event that better control is desired in the operation of the piston 25 upon firing of the cartridge 34 one or more stops 44 may be employed at the aft end of the nose cone 24 to limit rearward movement of the piston. Each such stop 44 is secured to and carried by the nose cone 24 projecting therefrom inwardly of the forebody to be disposed in the path of movement of the piston 25. When the use of such stops 44 may result in oscillation of the piston 25 and perhaps interference with the release of the balls 41 a compression spring 45 is employed to retain the piston 25 in the extreme rearward position with the ring 26 against the stop 44 and out of alignment with the opening 40.

When employed the spring 45 is disposed around the extension 29 between the thickened wall 31 of the nose cone 24 and the disc 27. Normally, the spring 45 is held in compression or cocked being overpowered by the retaining pin 39.

The size and structural integrity of each stop 44 may be materially reduced when desired by the additional provision of one or more bleed vents 46 in the thickened wall 31 of the nose cone 24. Where employed each vent 46 comprises a hole piercing the nose cone wall 31 transversely relative to the centerline X—X in communication with the recess 30 whereby gases therein are allowed to escape.

What is claimed is:

1. An external store for aircraft comprising a main body, a hollow truncated structure concentrically secured to and projecting in an upstream direction from said main body, a hollow nose cone telescopically connected to said structure adjacent the forward end thereof, piston means mounted for reciprocation in said nose cone, means normally operative to secure said piston means against movement relative to said nose cone and in engagement with said structure whereby said nose cone is disposed in the extended position, and a release operative to disconnect the securing means aforesaid and actuate said piston means to disengage said structure for the retraction of said nose cone.

2. An external store for aircraft comprising a main body, a hollow truncated structure concentrically secured to and projecting in an upstream direction from said main body, an interior bearing surface on said structure disposed substantially parallel to the longitudinal centerline thereof, a hollow nose cone having an exterior bearing surface complemental to said interior bearing surface for relative reciprocation therewith to and from extended and retracted positions, corresponding transverse openings piercing said structure and cone respectively and adapted to align one with the other when the nose cone is disposed in an extended position relative to said structure, a retaining plug closing the outer end of the opening in said structure, a ball in the opening in said cone adapted to extend outwardly therefrom and into the opening in said structure when said openings align as aforesaid, a piston operable within said nose cone and normally disposed against said ball forcing it outwardly as aforesaid thereby securing the nose cone in the extended position, and actuating means to move said piston out of the normal position aforesaid whereby said ball is free to withdraw from the opening in said interior surface and the nose cone move to the retracted position.

3. An external store for aircraft comprising a main body, a hollow truncated supporting structure concentrically secured to and projecting in an upstream direction from said main body, a hollow nose cone telescopically associated with said structure adjacent the forward end thereof, a piston mounted for reciprocation in said nose cone, a releasable lock operative between said supporting structure and said nose cone when the nose cone is in the extended position, an engagement between said piston and said nose cone operative to dispose and maintain the piston against said lock rendering it operative, a release for said engagement operative to permit reciprocation of said piston whereby said lock is rendered inoperative, and a stop carried by the nose cone to limit the reciprocation of said piston.

4. An external store for aircraft comprising a main body, a conical hollow forebody secured to and projecting from said main body with its apex upstream, said forebody being formed of multiple segments telescopically disposed one to another, a lock between adjacent overlapped ends of said segments, means normally engaging said lock and operative to secure said lock in position to maintain said segments in an extended position, and a release operative to move said lock-engaging means out of its normal position aforesaid whereby said lock is disengaged and said segments may be telescoped during flight.

5. An external store for aircraft comprising a main body, a conical forebody formed by multiple telescopically arranged segments connected to and projecting from said main body, engagement means operative between said segments when extended to secure them against relative movement, biasing means internally of said forebody tending to release said engagement means from the operative position aforesaid whereby said segments may be contracted, overpowering means normally operative on said biasing means to retain said segments in the extended position, and a release rendering said overpowering means inoperative whereby said biasing means is free to operate and the segments may contract.

6. An external store for aircraft comprising a main body, a hollow truncated structure concentrically secured to and projecting in an upstream direction from said main body, an interior bearing surface on said structure disposed substantially parallel to the longitudinal centerline thereof, a hollow nose cone having an exterior bearing surface complemental to said interior bearing surface for relative reciprocation therewith to and from extended and retracted positions, locking means including a spherical projection engaged between said nose cone and said structure to secure said nose cone in the extended position, and means for releasing said projection to permit it to disengage from said structure whereby said nose cone may reciprocate to the retracted position during flight.

7. An external store for aircraft comprising a main body, a hollow truncated supporting structure concentrically secured to and projecting in an upstream direction from said main body, a hollow nose cone telescopically associated with said structure adjacent the forward end thereof, a lock between said cone and structure to secure the cone in an extended position relative to the structure, biasing means operative on said lock and tending to release it whereby the cone may be retracted within the structure, overpowering means operative in opposition to said biasing means to normally retain the nose cone in the extended position aforesaid, and a release to render said overpowering means inoperative.

References Cited by the Examiner
UNITED STATES PATENTS

| | | | |
|---|---|---|---|
| 2,653,541 | 9/53 | Kanode et al. | 102—6 |
| 3,005,406 | 10/61 | Ronfeldt | 102—6 |
| 3,006,288 | 10/61 | Brown | 244—137 X |
| 3,112,906 | 12/63 | Zeyher | 244—138 |

FERGUS S. MIDDLETON, *Primary Examiner.*